United States Patent
Ansbro et al.

(10) Patent No.: US 6,330,294 B1
(45) Date of Patent: Dec. 11, 2001

(54) METHOD OF AND APPARATUS FOR DIGITAL RADIO SIGNAL RECEPTION

(75) Inventors: Andrew Peter Ansbro; Spase Drakul; Antonio Fanigliulo, all of Turin; Gianluca Fontana, Rivoli, all of (IT)

(73) Assignee: CSELT- Centro Studi E Laboratori Telecomuniicazioni S.p.A., Turin (IT)

( * ) Notice: Subject to any disclaimer, the term of this patent is extended or adjusted under 35 U.S.C. 154(b) by 0 days.

(21) Appl. No.: 09/080,043

(22) Filed: May 15, 1998

(30) Foreign Application Priority Data

Jul. 14, 1997 (IT) .............................................. TO97A0633

(51) Int. Cl.[7] .................. H04B 7/10; H04L 1/02
(52) U.S. Cl. .................... 375/347; 375/229; 375/230; 375/231; 375/232
(58) Field of Search .................................... 375/347, 229, 375/230, 231, 232, 350, 343

(56) References Cited

U.S. PATENT DOCUMENTS

| | | | |
|---|---|---|---|
| 3,633,107 | * 1/1972 | Brady | 325/305 |
| 5,202,903 | * 4/1993 | Okanoue | 375/100 |
| 5,303,226 | * 4/1994 | Okanoue et al. | 370/17 |
| 5,481,572 | 1/1996 | Skoeld et al. | 375/347 |
| 5,530,725 | * 6/1996 | Koch | 375/347 |
| 5,559,723 | 9/1996 | Mourot et al. | 364/517 |
| 5,862,192 | * 1/1999 | Huszar et al. | 375/347 |
| 5,901,174 | * 5/1999 | Richards | 375/229 |

FOREIGN PATENT DOCUMENTS 0 682 420 A    11/1995 (FR) .

OTHER PUBLICATIONS

Lee H–N et al: Channel Estimation Based Adaptive Equalization/Diversity Combining For Time–Varying Dispersive Channels Vehicular Technology Conference, US, NY IEEE, vol. Conf. 47, 1997, pp. 884–888.

* cited by examiner

Primary Examiner—Mohammad H. Ghayour
(74) Attorney, Agent, or Firm—Herbert Dubno

(57) ABSTRACT

A receiver is described, for instance for GSM systems, wherein a plurality of digital signals each comprising a training sequence ($x_p(t)$) usable to generate an estimation of the transmission channel are received in diversity (A.1 . . . A.N) in the form of a plurality of replicas (10.1 . . . 10.N) each comprising a respective replica of the training sequence. The received digital signal is subjected to a delaying action thereby obtaining a plurality of versions of such signal, each comprising a respective set of signal replicas. Each version is subjected to a respective filtering action (23.1 . . . 23.N) independently from the other versions, by employing a respective first set of filtering coefficients ($w^*_{11} \ldots w^*_{N1} \ldots w^*_{Nj}$) obtained starting from a respective initial set of filtering coefficients. This respective initial set is obtained by performing, for each replica of the received signal, a filtering action exploiting a respective second set of filtering coefficients identified as a signal ($u(t)$) able to generate, by convolution ($u(t)*x_p(t)$) with the training sequence, a unitary function $\delta(t)$ on a given time window, preferably on one bit. The filtering coefficients of the first set are derived starting from said initial set of filtering coefficients through an MMSE adaptation, preferably with an initial rapid convergence phase of the RLS type followed by an optimisation phase of the LMS type.

11 Claims, 5 Drawing Sheets

US 6,330,294 B1

METHOD OF AND APPARATUS FOR DIGITAL RADIO SIGNAL RECEPTION

FIELD OF THE INVENTION

The present invention relates to digital communication and, more specifically, to a method of and apparatus for the reception of digital radio signals.

BACKGROUND OF THE INVENTION

The invention has been developed with particular attention to its possible use within mobile radio communication systems such as the systems known as GSM and IS-95. In any case, the invention can be applied in any context wherein the functional reception diagram applied is similar, directly or substantially, to the diagram shown in FIG. 1.

To illustrate how the invention can be utilized in an existing system, the diagram of a conventional, single antenna, GSM receiver is presented in FIG. 1. In this diagram, a line 11 receives a baseband digital signal. In addition to an actual useful signal component, the signal comprises a training signal component such as a preamble or a so-called "midamble", essentially comprising a string of binary characters or bits $x_p(t)$ which is assumed to be known. The signal received by the antenna (converted in a form suitable for processing in a module 20X. There the antenna signal is, for instance, converted into baseband and subjected to the conditioning operations currently used in the art for demodulation.

The signal on line 10 is split by a demultiplexing block (not shown in the drawing) between two branches 11 and 12, intended to convey the training signal or the information signal, respectively. It should be stated that, as is well known to the person skilled in the art, such splitting does not necessarily correspond to an actual routing over two different physical channels, since it can be effected in a virtual manner by means of different processing operations.

The processing performed by the first branch 11 is aimed at obtaining an estimate of the channel impulse response whereon the transmitted signal has propagated. This estimated response can be obtained by analyzing how the training signal is effected by the channel. The aforesaid estimate is usually performed by the correlation (or the matched filtering) effected in a module indicated by 14. In block 15, the convolution is calculated between the windowed estimate of the channel impulse response and a set of possible transmitted baseband signals $S'_p(t)$ (over one bit period) to obtain the signal estimates $x(t)$. These estimates are fed to a processing module 16 where the signal routed over a branch 12 arrives after a possible filtering effected in filter 17. This filter has a impulse response equal to the windowed ambiguity function (the ambiguity function being, as known, the auto-correlation of the training sequence), i.e. a response given by $[X_p(t)*Xp(T-t)] h_w(t)$, where $h_w(t)$ is a window function. This method has been described by R. Steel, "Mobile Radio Communications", New York 1992, Chapter 6. In processing module 16 a measurement of the "distance" (incremental metrics for one bit interval) between the generated sequences and the actual received data is performed. The incremental metrics calculated in block 16 are fed through line 18 to a Viterbi processor (known in the art), included in block 19, where the new metrics for each state are established, as occurs in GSM transmission systems. The Viterbi processor is followed in cascade arrangement by a differential decoder (equally known in the art) which emits the output data stream. Essentially, the received signal on line 10 is subjected to a processing operation that can ideally be seen as a complimentary and opposite action to the one effected by the transmission channel.

In the processing module 16 this signal is subjected to a processing operation that can ideally be seen as a complementary and opposite action to the one effected by the transmission channel. All with the purpose of generating as an output, on the line indicated as 18, a signal destined to constitute a replica, as faithful as possible, of the transmitted signal, in view of the subsequent decoding. Such decoding can be performed, for instance, by means of a Viterbi decoder 19, as occurs in GSM transmission systems.

From the analysis of the reference diagram in FIG. 1, it is clear that the more articulated is the set of alternations the transmitted signal—and also the training sequence—may have undergone during transmission over the cannel, the more complex and onerous is the set of processing operations performed in elements 14, 15, 16 and 19.

In particular, in mobile radio systems (at least for base stations, but the use of this technique is being extended also to mobile terminals) the use of diversity reception techniques based on the use of a plurality of N receiving antennas has become widespread. The signal received by an array of antennas of this kind in reality comprises N replicas of the same starting signal, which replicas are received by the aforesaid N antennas in a different way (for example due to a different distribution of the echoes, etc.).

The invention exploits this multiplicity of antennas to develop a more robust receiver structure which enhances the communication link quality. The processing of the individual system at the receiving side entails the analysis of a certain number (for example, M) of symbols received successively. A receiver architecture with N antennas should, for the same propagation environment, consider the analysis of N×M symbols. Recovering the transmitted signal in case of the multi-input system essentially entails inverting a system matrix (N×j, where N is the number of antennas and j the number of time instants (i.e. the number of consecutive snapshots) considered necessary to faithfully reproduce the transmitted signal. Direct inversion of this matrix can, if done without due attention, lead to noise amplification and instability. Moreover, it can be rather onerous in terms of time and hardware required, and it hardly appears practical for real-time processing of the received signals, as is required in case, for example, of voice signals.

OBJECT OF THE INVENTION

The object of the present invention therefore is to provide a solution that, though similar to the general diagram shown in FIG. 1, does not give rise to the drawbacks described above, further allowing a greater resolution in the performance of the auto-correlation function of the training signal $X_p(t)$.

SUMMARY OF THE INVENTION

According to the present invention, this object is attained thanks to a method and a system.

For receiving digital signals comprising a training sequence ($x_p(t)$) usable to generate an estimate of the transmission channel, wherein the digital signal is received in diversity as a plurality of signal replicas each comprising a respective replica ($x_p(t)*a(t)$) of the training sequence. The method comprises the operations:

generating a plurality of versions of the received digital signal separated by a given delay interval (T), each version comprising a respective set of signal replicas;

subjecting each of the versions of the received digital signal to a respective filtering action (23.1, . . . , 23.j) independently of the other versions; the respective filtering action being performed on each of the versions by applying to the respective set of signal replicas a respective first set of filtering coefficients ($w^*_{11}, \ldots, w^*_{N1}; \ldots; w^*_{1j}, \ldots, w^*_{Nj}$) obtained starting from a respective initial set of filtering coefficients, obtaining the respective initial set of filtering coefficients by subjecting the respective version of the received digital signal to a respective second filtering action performed independently of the respective second filtering actions effected on the other versions of the received digital signal; each of the respective second filtering actions being performed with a respective second set of filtering coefficients identified as a signal (u(t)) able to generate, by convolution $(u(t)^*x_p(t))$ with the training sequence, a unitary function on a given time slot.

The respective second set of filtering coefficients (u(t)) are identified as a signal able to generate by convolution (u(t)) *xp(t)) with the training sequence a unitary function on one bit. The respective first set of filtering coefficients can be generated starting from a respective initial set of filtering coefficients by means of a Minimum Mean Square Error (MMSE) adaptation.

The adaptation can be chosen in the group constituted by a Recursive Least Square (RLS) adaptation and by a Least Mean Square (LMS) adaptation.

The minimum mean square error adaptation comprises an initial rapid convergence phase of the recursive least square (RLS) type followed by a phase of the least minimum square (MLS) type.

The invention also involves a method of receiving digital radio signals including a training sequence ($X_p(t)$) usable to generate an estimate of the transmission channel, wherein the digital signal is received in diversity as a plurality of signal replicas each comprising a respective replica $X_p(t)^*a$(t) of the training sequence. The method comprises the operation of performing an initial estimate of the transmission channel by subjecting each replica of the training sequence to a respective filtering action, performed independently of filtering actions effected on the other replicas of the training sequence, each of the filtering actions being performed with a respective set of filtering coefficients identified as a signal (u(t)) able to generate, by convolution $(u(t)^*X_p(t))$ with said training sequence, a unitary function on a given time slot.

An apparatus for the reception of digital signals comprises a training sequence (xp(t)) usable to generate an estimate of the transmission channel, the apparatus comprising a plurality of antennas operating in diversity, so that the digital signal is received in the form of a plurality of signal replicas comprising each a respective replica (xp(t)*a(t)) of said training sequence. The apparatus can comprise:

delay means for generating a plurality of versions of the received digital signal separated by a given delay interval (T), each version comprising a respective set of signal replicas, second filtering means for subjecting each of the versions of the digital signal received to a respective filtering action independently from the other versions, the respective second filtering action being performed on each of said versions by applying to the respective set of signal replicas a respective second set of filtering coefficients ($W^*_{11} \ldots W^*_{N1} \ldots W^*_{11}$, $W^*_{1j} \ldots W^*_{Nj}$) obtained starting from a respective initial set of filtering coefficients determined, second filtering means for obtaining the respective initial set of filtering coefficients by subjecting the respective replica of the training sequence to a respective second filtering action performed independently from the respective second filtering actions performed on the other respective replicas of said training sequence; each of these respective second filtering actions being performed with a respective second set of filtering coefficient identified as a signal (u(t)) able to generate by convolution $(u(t)^*X_p(t))$ with said training sequence a unitary function on a given time slot.

The respective set (second set) of filtering coefficients (u(t)) can be identified as a signal able to generate by convolution $(u(t)^*X_p(t))$ with said training sequence a unitary function over a preset interval.

The apparatus can comprise an adaptation module which calculates the respective first set of filtering coefficients starting from the respective initial set of filtering coefficients by means of an adaptation of the minimum means square error type.

The adaptation module can operate according to an algorithm chosen in the group comprising recursive least square adaptation of the type and least mean square adaptation.

The adaptation module can operate with an initial rapid convergence phase of the recursive least square type followed by a phase of the least mean square type.

The adaptation module can be arranged to generate a respective first set of filtering coefficients for each of a plurality of users within a same cell of a digital radio communication system in which the users use the same physical channel (time-frequency channel).

The apparatus of the reception of digital signals comprising a training sequence (xp(t)) usable to generate an estimate of the transmission channel, can have a plurality of antennas operating in diversity, so that the digital signal is received in the form of a plurality of signal replicas comprising each a respective replica (xp(t)*a(t)) of said training sequence. The apparatus can have filtering means for performing an initial estimate of the transmission channel by subjecting a respective replica of the training sequence to a filtering action performed independently from the filtering actions performed on the other replicas of said training sequence; each of these filtering actions being performed with a respective set of filtering coefficients identified as a signal (u(t)) able to generate by convolution $(u(t)^*X_p(t))$ with the training sequence a unitary function on a given time slot.

The invention is primarily based on the fact that in a field of use such as the GSM mobile radio system, an echo over the individual channels of diversity reception (N receiving antennas) is essentially discretized by sampling the received signal, and therefore the matrix that identifies the behavior of the channel (i.e. the matrix to be estimated and inverted at the receiving side) actually comprises a large number of elements with null or nearly null value.

BRIEF DESCRIPTION OF THE DRAWING

The invention shall now be described, with reference to the accompanying drawing, wherein.

SPECIFIC DESCRIPTION

Figure 1:
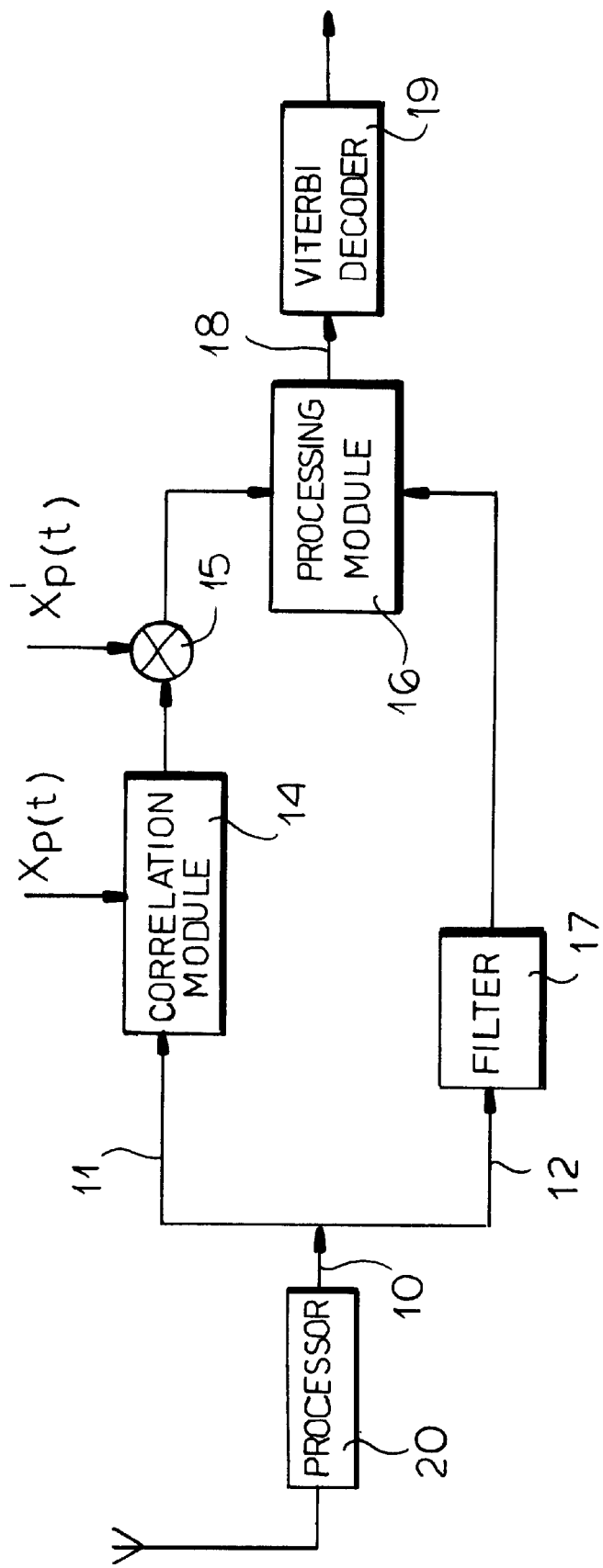
FIG. 1 schematically shows a receiver architecture for GSM systems, that has already been extensively described above.
Figure 2:
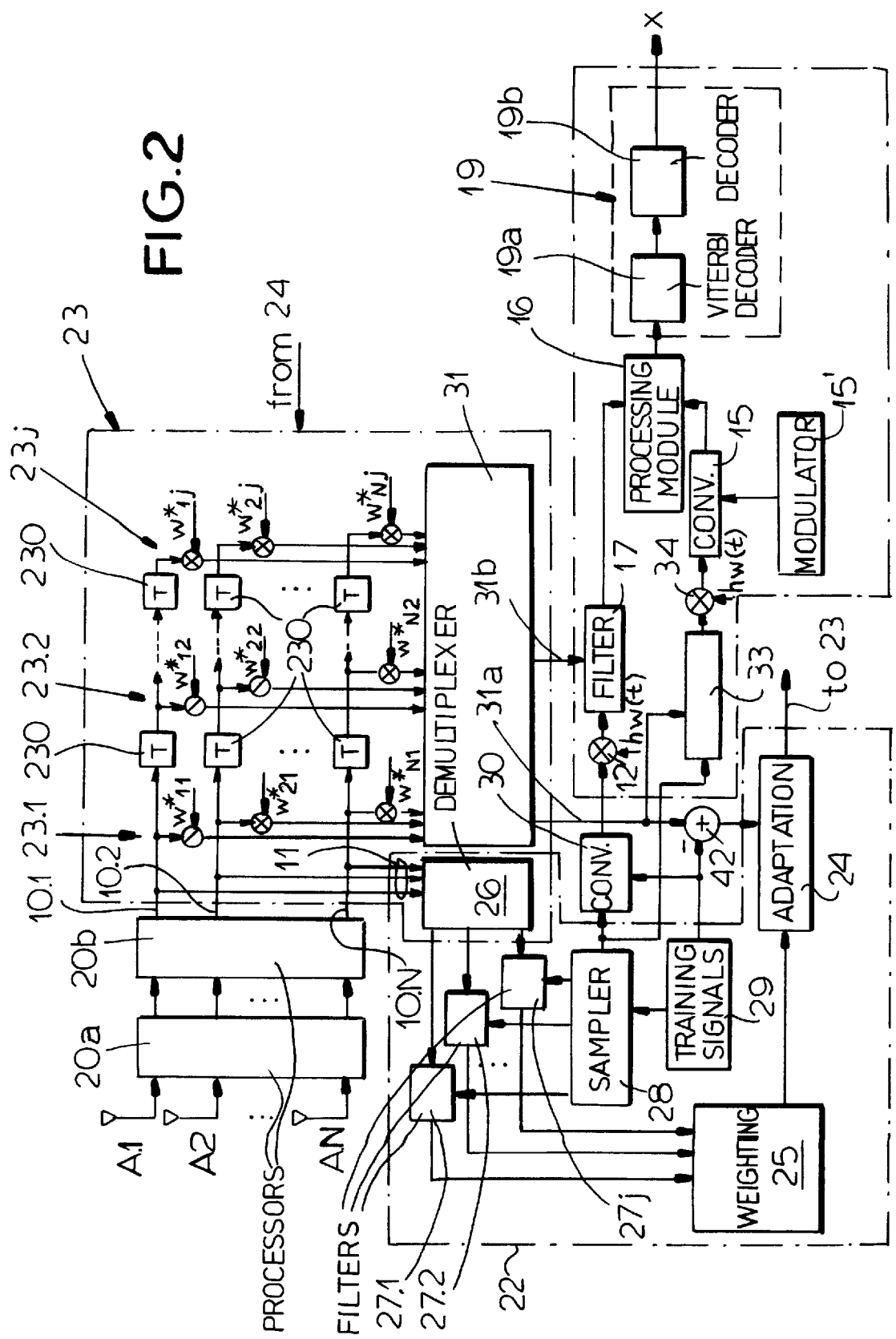
FIG. 2 shows, in block diagram form, the structure of a receiver for operating according to the invention.
Figure 3:
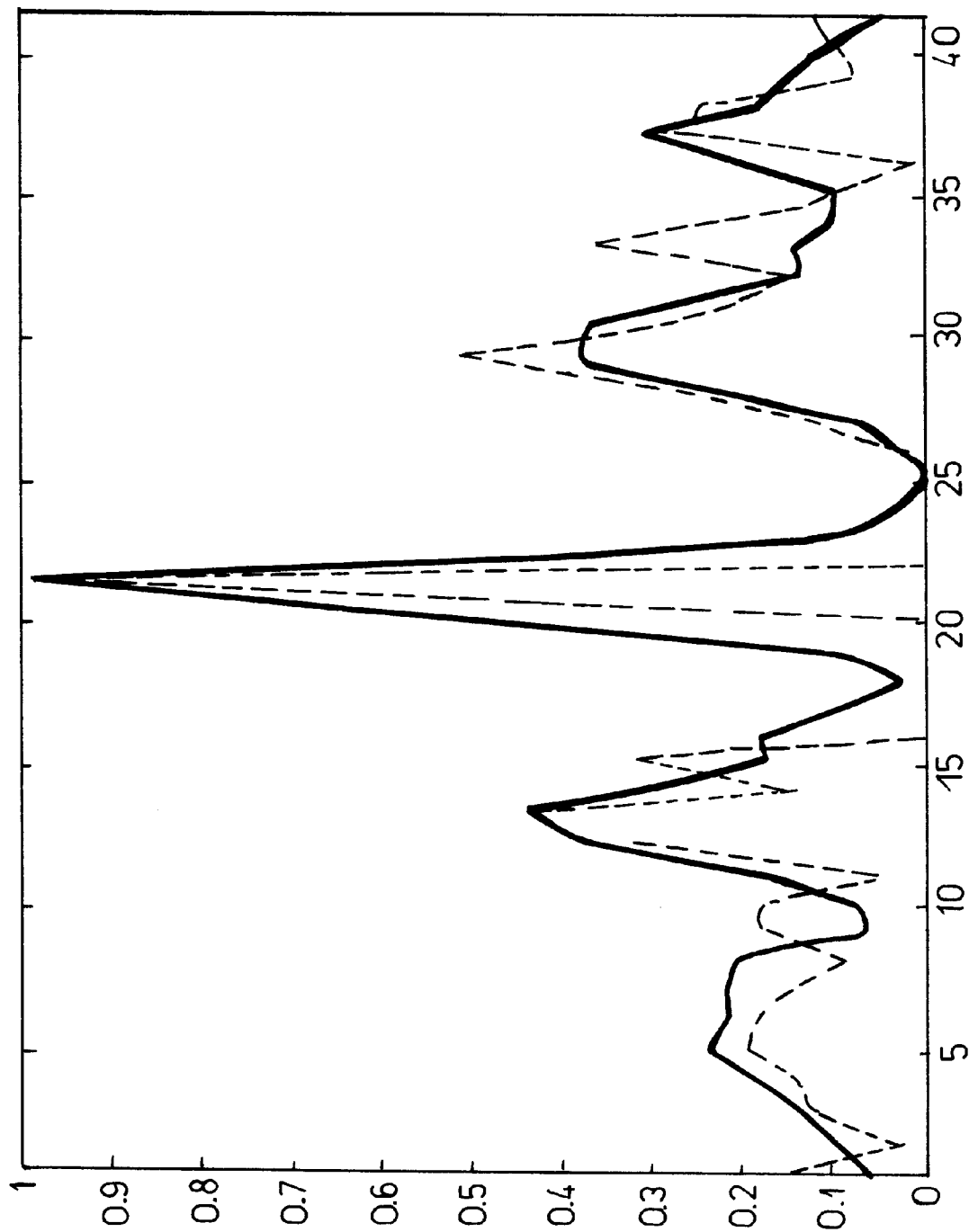
FIG. 3 is a diagram illustrating the performance of the system according to the invention in terms of autocorrelation of the training signal.

The diagram in FIG. 2 illustrates an extended general layout block diagram which is similar to the one shown in FIG. 1 and makes use of a plurality of input antennas A.1 . . . A.n connected according to a typical diversity reception scheme. Like elements in FIGS. 1 and 2 are indicated by like references.

Thus single input line 10 shown in FIG. 1 corresponds in FIG. 2 to N input lines 10.1 . . . 10.N, each conveying a respective replica of the signal received, which can be expressed, in general, in the form of a complex signal, thus a signal with a real part and an imaginary (or quadrature) part. Each of these replicas is derived from a respective input antenna A.1, . . . , A.N, through a conversion from radio frequency to intermediate frequency followed by a conversion from the intermediate frequency to the base band. Such conversions are individually performed in a known manner on the N signal streams coming from the N antennas in blocks 20a and 20b corresponding, as a set, to block 20 in FIG. 1.

Reference 26 indicates a demultiplexing unit that splits the information signal and the known midamble into different streams in the same manner as mentioned in connection with FIG. 1, the only difference being that the operation performed by demultiplexer 26 correspond to the splitting of N parallel paths.

Blocks 16 and 19 (the latter being split in the FIG. into Viterbi decoder 19a and the differential decoder 19b) perform the same operations as the homonymous blocks in FIG. 1.

The whole of the circuits enclosed in dashed line block 22 performs the "channel estimation" of the sample baseband received signals 10.1 . . . 10.N according to the invention. The estimated channel impulse responses from the outputs of FIR (Finite Impulse Response) filters 27.1 . . . 27.N are achieved by computing the convolution between the input training signals $X_p(t)$ (provided by block 29) and the impulse responses u(t) of the FIR filters. These filters can be implemented as transversal filters. The impulse response u(t) is determined by using the assumption that the convolution $X_p(t)*u(t)$ is a quasi-Dirac impulse. By sampling impulse response u(t) in block 28, the coefficients of the FIR filters are obtained. The selection of the appropriate impulse responses u(t) depends on the propagation channel. The outputs of filters 27.1 . . . 27.N are processed in a block 25 where the initial weights for the adaptation algorithm performed in block 24 are selected. The adaptation algorithm is advantageously an MMSE (Minimum Mean Square Error) algorithm and can be implemented as an RLS (Recursive Least Square) or an LMS (Lease Mean Square) algorithm.

Block 23 (beam-forming network) comprises a bank of j filters individually shown at 23.1, . . . , 23.j. Each filter operates on a corresponding version of the input signal, a first version (processed by filter 23.1) corresponding to the signal received on the lines 10.1 . . . 10.N while the other versions correspond to the same signal successively delayed by delay intervals T, 2T . . . (j−1)T as an effect of the passage through corresponding delay lines 230. Interval T can correspond, for instance, to the bit period used for transmission (conventional equally spaced equaliser). However, fractionally spaced or non-equally spaced equalisers can also be used.

More particularly, in filter 23.1 weighting coefficients $w^*_{11}, w^*_{21} \ldots w^*_{N1}$ are applied to the replicas of the received signal. A similar processing occurs in filter 23.2, with the application, to the various signal replicas delayed by an interval T, of coefficients $w^*_{12}, w^*_{13} \ldots w^*_{N2}$, and so on to filter 23.j, where coefficients $w^*_{1j}, w^*_{2j} \ldots w^*_{Nj}$ are applied to the various signal replicas delayed by an interval (j−1)T.

The aforesaid weighting coefficients, which can be ideally represented as a matrix with N rows and j columns, are computed by block 24 that applies a mechanism of estimation with adaptation which will be better described further on.

Regardless of the possible presentation of the coefficients $w^*_{11} \ldots w^*_{Nj}$ in matrix form, it will be appreciated that the set of filters 23.1 . . . 23.j effect, on the various versions of the signal present on lines 10.1 . . . 10.N, a processing action that does not have a matrix nature in each of the j time stages: indeed, each of the various versions of the signal successively delayed by an interval T is subjected to an independent filtering operation (see e.g. Fuhal and Bonek, "Space-time decomposition: Exploiting the full information of a training sequence for an adaptive array", Electronics Letters, vol. 32, no. 21, pp. 1938–1939, October 1996).

This choice has proved advantageous with respect to the general solution such as that mentioned above, where the channel estimation and equalisation or beam forming of the received signal entail a matrix estimation and inversion operation, with the drawbacks analysed above. Differently from that known solution, the embodiment shown in FIG. 2 provides for a channel estimation operation performed independently on each version of the received signal, considered in the set of the replicas it is composed of: this allows taking into account the effects of the channel (typically due to echo phenomena) on that version. This results, on one hand, into a simplification of the processing operations and, on the other hand, into the possibility of avoiding negative phenomena (error propagation, noise amplification) linked to the specific nature of the received signal (for instance a GSM signal, in the exemplary embodiment considered).

The following mathematical description of the method deals with a very important aspect of the invention, that is the improved channel estimation in the initial step of the weight adaptation. In particular, the coefficients of the impulse response u(t) in FIR filters 27.1 to 27.N are chosen in such a way as to meet the relation $$x_p(t)*u(t)=\delta(t) \tag{1}$$

$$\frac{1}{16}\sum_{k=5}^{20} \alpha_k \alpha_{k+n} = \delta_n \qquad n=-4,\ldots,0\ldots,4 \tag{5}$$

However, while this property expresses a Dirac delta on one bit, when the modulation is applied, the auto-correlation of the modulated sequence $x_p(t)$ expressed as $$R(\tau)=\int x_p(t)*x_p(\tau-t)dt \tag{6}$$

is smeared out over 4 bits, with a consequent loss of resolution.

In the situation just described it is possible and particularly advantageous to use a method of filtering the training sequence that originates an auto-correlation function having a delta-like behavior on a smaller interval, in particular, but not exclusively, of one bit.

The calculation of the improved initial channel estimate (IICE) response is obtained by using the matrix representation of the sampled signals $x_p(n)$ and u(n). For instance the output of a matched filter like block 14 in FIG. 1 is given by $$R_{MF}(n) = \sum_{k=1}^{length(x)} x_p(n-k) \cdot x_p^H(k) \tag{7}$$

where $x_p(n)$ is the known transmitted training sequence, length(x) indicate the sequence length and the superscript H indicates hermitian conjugate. The response of the IICE filter, u(n), on the signal $x_p(n)$ is given by $$R_{MF}(n) = \sum_{k=1}^{length(x)} x_p(n-k) \cdot x_p^H(k) \tag{8}$$

The auto-correlation function determined by relation (7) has a time duration equal to twice the time duration of the GMSK impulse response (i.e., 4 bit times). We can perform a better auto-correlation function by using an impulse response u(n) which satisfies the following matrix equation $$X_p \cdot u^H = \delta \tag{9}$$

where $$X_p = \begin{bmatrix} x_1 & \cdots & x_{16} \\ \vdots & \ddots & \vdots \\ x_{11} & \cdots & x_{26} \end{bmatrix} \tag{10}$$

The equation system expressed above needs not necessarily be square, since the number of constraints can be greater, less than, or equal to the number of variables in u(t).

The inversion of this system is performed by using singular value decomposition and the related solution can be expressed in the form $$u(t) = X^{-1} \cdot \delta \tag{11}$$

The auto-correlation of this filter and that of the conventional GSM matched filter where $\delta$ is the Dirac delta.

Impulse response u(t) is provided to block 30, which actually effects the convolution defined in equation (1). The output of block 30 is multiplied in multiplier 32 by a window function $h_w(t)$ to produce a windowed ambiguity function $\delta_w(t)$.

The first output signal 31a of beam-forming network 23 is the received training signal $x_p(t)$ affected by a scalar channel response a(t), i.e., $$\hat{x}_p(t) = x_p(t) * a(t) \tag{2}$$

By the convolution of that training signal by the impulse response u(t) in block 33 and multiplication by the same window function $h_w(t)$ an estimate $a_w(t)$ for a given delay is obtained, according to relation:

$$[x_p(t) * a(t) * u(t)] h_w(t) \tag{3}$$

As known to those skilled in the art, the convolution performed in block 30 is the more delta-like the more accurate is the estimate of the channel response. However, this desired property must be compromised to a same extent in actual real-time communication systems.

The second output 31b of beam-forming network 23 conveys the information signal x(t,τ) affected by the same impulse channel response a(t). The convolution between such signal and the windowed ambiguity function $\delta_w(t)$ is computed in block 17, that gives the following output:

$$x(t,\tau) * a(t) * \delta_w(t) \tag{4}$$

The output of block 17 is used in block 16 for calculating the incremental metrics.

Block 15 performs the convolution between the windowed channel response $a_w(t)$ and the baseband signal generated in modulator 15'. In this way all possible signals are created. They are used in the block 16 for obtaining all incremental metrics as in FIG. 1.

The determination of the weights in block 24 is based on the minimisation of the mean square error between the received training signal on 31a and the original training signal $x_p(t)$ from block 29, already known to the receiver. The subtraction between the two signals is performed in 42.

The receiver structure shown in FIG. 2 is adapted to be used with particular advantage, for instance, within a GSM transmission scheme wherein a midamble of 26 bits is surrounded by 58 information bits.

Figure 4:
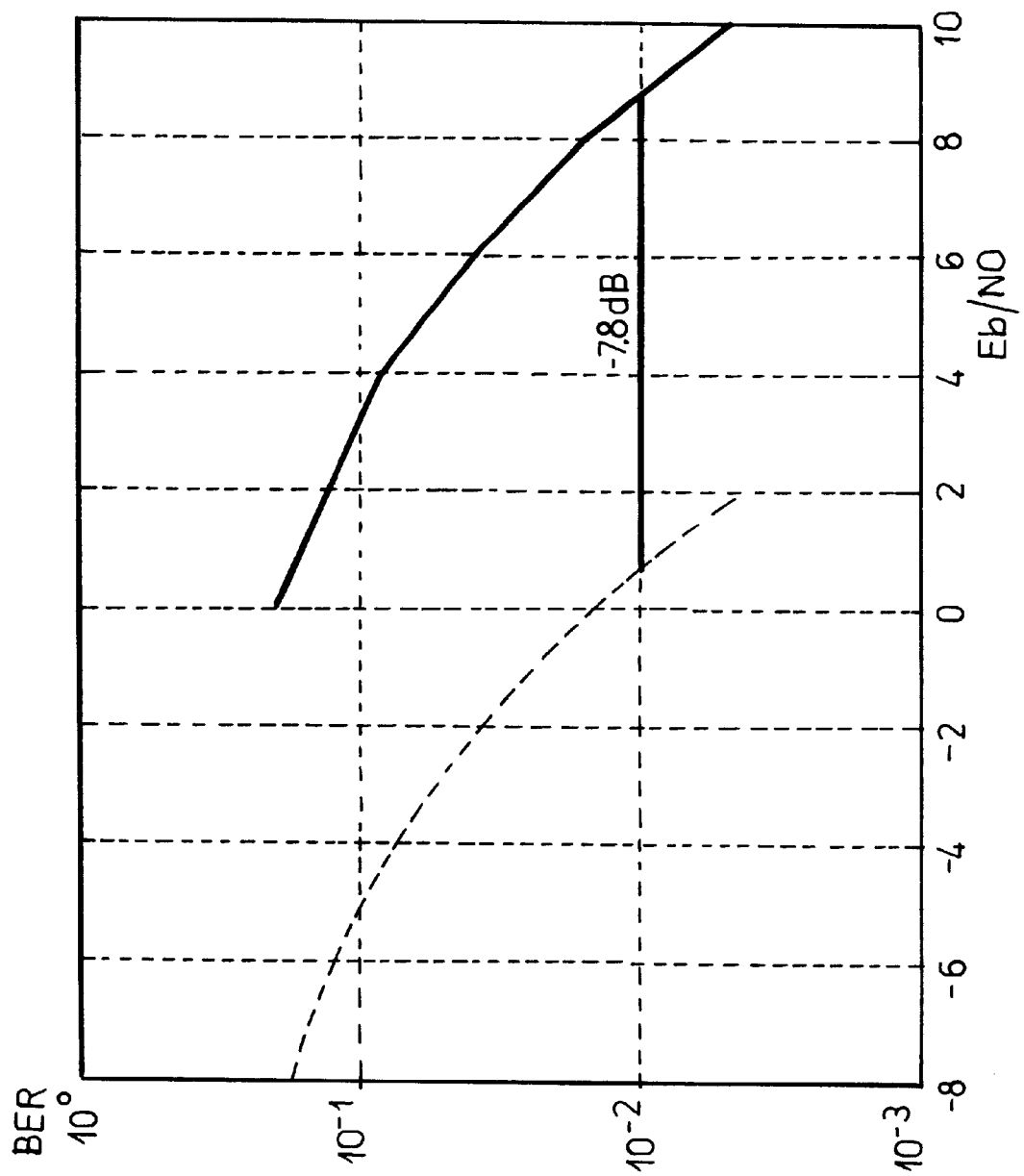
FIG. 4 is a diagram illustrating the performance of the invention in a given transmission channel.

In this case, the midamble sequence $\alpha_n$ with n=1 . . . 26 (physical values) is characterized by a particular auto-correlation property which allows channel estimation with a 5 bit delay, i.e. an estimation based on relation: are comparatively shown in FIG. 4 where the number of bits is plotted on the x-axis and the scale of the y-axis is a scale normalized so as to attribute a unit value to the auto-correlation peak. The solid line curve represents the conventional estimation, whereas the dashed line represents the behaviour of the innovative filter described above. It will be noted in particular that the latter originates an auto-correlation on a single bit with virtually total suppression of the auto-correlation value for a band of a few bits respectively before and after the central auto-correlation peak.

Channel estimation using the conventional approach and the approach proposed herein can be expressed respectively by the two equations that follow:

$$h_{est\_old}(\tau) = \int_{-\infty}^{\infty} y(t) x_p^*(\tau - t) dt \tag{12}$$

$$h_{est\_new}(\tau) = \int_{-\infty}^{\infty} y(t) u(\tau - t) dt \tag{13}$$

where $y(t) = x_p(t) * h(t)$, h(t) representing the pulse response of the transmission channel, and $x^*_p$ is the conjugate complex of $x_p(t)$.

Since the correlation between u(t) and $x_p(t)$ approximates the behaviour of an ideal Dirac delta function better than equation (12) reported above, by using equation (13) rather than equation (12) a better channel estimation resolution is obtained.

The coefficients of u(t) can be further multiplied, if deemed appropriate, by fixed coefficients to form further spatial filtering such as a Chebychev filtering.

Note that a filter like filter 17 in FIG. 1 is now no longer necessary (in the exemplary embodiment of application to GSM) as the matched filter is not used in the channel estimation. Such filter may however be present in case of application to other systems.

From the above it follows that the solution according to the invention allows obtaining a receiver wherein channel interference and the non-linear effects of the modulation, such as GMSK modulation, are treated separately. The receiver is capable of exploit the spatial structure present both in the signal and in the interference. On the basis of these premises it is possible to obtain a receiver structure operating both in angle (diversity reception) and in time in order to contrast both intersymbol interference (ISI) and interference from different transmitters.

In particular, the diagram in FIG. 2 shows the use of an MMSE (Minimum Mean Square Error) equaliser to mitigate the channel defects separately, followed by a Viterbi decoder for the equalisation of the GMSK signal (demodulation). The signal coming from the MMSE equaliser is equalised and phase aligned. The receiver can be utilised so as to incorporate different diversity reception schemes, with a solution that, at least at present, is particularly advantageous for use in the base stations of mobile radio systems. The same structure can in any case also be applied to mobile receivers equipped with multiple antennas for diversity reception.

The salient characteristics of the solution shown—purely by way of non limiting example—with reference to the currently preferred embodiment of the invention can be briefly described in the following terms.

The signal received by the N antenna elements A.1 , . . . A.N is converted into base band, and the digitized signal thus obtained is demultiplexed (block 26) thereby separating the training sequence (typically a midamble) from the data sequence. The filtering technique described above is applied to the N sequences thus obtained thereby attaining the identification of the relevant echoes. The values corresponding to the echoes identified (in practice the complex conjugates thereof) and their range are used as initial values of the MMSE algorithm. The subsequent iteration of the related scheme (typically RLS) are performed on each identified echo using the training sequence. In particular this adaptation can be applied to the first and the last bit of the training sequence thereby to avoid miscalculating interfering signals. These outputs are further adapted for each echo by using an LMS algorithm which, if necessary, can be used to invert the entire system (all echoes).

This solution further allows better echo identification and a reduced white noise gain since only the echoes are processed. A good initial estimation of the weights is also available, based only on the signal, together with a rapid convergence of the RLS algorithm, since the latter operates only on N weights for each echo, with the consequent possibility of performing the related processing operations in parallel on the various channels: thus, both a reduction of the calculation burden and a quicker calculation are obtained just thanks to the possibility of operating in parallel. It is possible to think of adopting an LMS type iteration in order to obtain an overall optimal scheme starting from the sub-optimal echo-by-echo approach. As stated above, the possibility of using bits at the beginning and at the end of the training sequence leads to a very significant reduction in the possibility of an incorrect detection of interfering signals coming from other transmitters.

Figure 5:
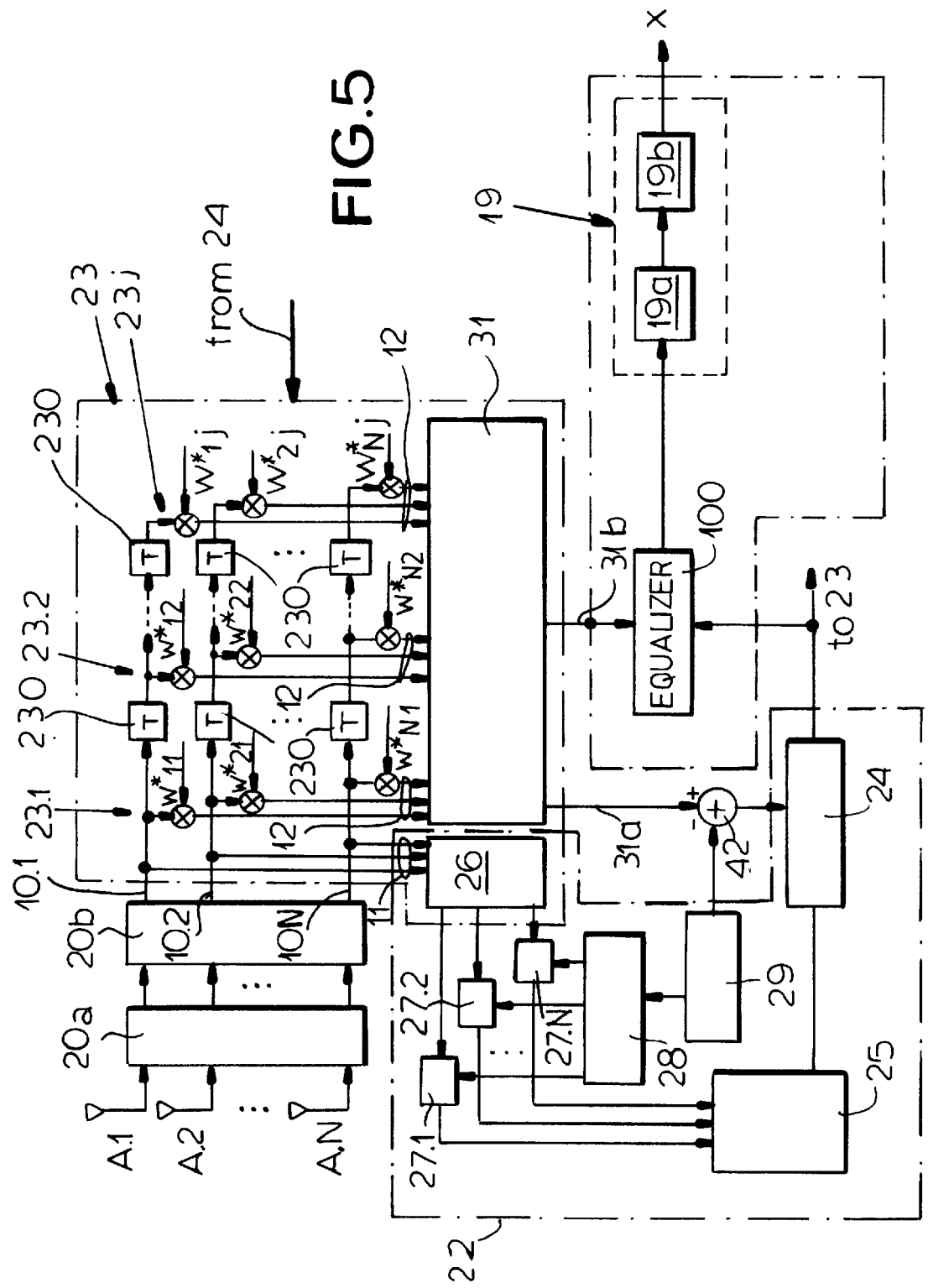
FIG. 5 illustrates a variant of the invention.

The advantages of the above described invention can be summarised as follows:

1) The initial weight adaptation helps coming closer to the global minimum of the MMSE function, and therefore improves the convergence speed of the algorithm used;
2) Block 22 actually provides for a suppression of unwanted signals from the other users (co-channel interference suppression);
3) Using the space-time equaliser results in adjusting the signal from the antenna elements so as to give maximum signal-to-noise ratio by using a maximal-ratio combining strategy, since the adaptation of different stages is carried out in parallel,
4) The improved initial channel estimate suggests the possibility of using a maximum likelihood sequence estimation as the optimal strategy for dealing with intersymbol interference, since the co-channel interference has been suppressed in block 22: In such conditions the block diagram in FIG. 2 may be adapted to the so-called blind equalisation and simplified as shown in FIG. 5, where an MMSE equaliser 100 receiving the data signal through line 31b and the weights present at the output of block 24 replaces the whole of blocks 17, 32, 33, 34, 15', 15, 16 in FIG. 2

The preferred embodiment of the invention illustrated in FIG. 2 has the additional advantage of an improved synchronization property. The synchronization strategy is based on the oversampling of the received signal. The received signals are sampled with a sample rate P times the bit rate. Thus P different data sequences are obtained. In this way the resolution of the improved initial auto-correlation function is better and the clock synchronisation is improved. Therefore a coarse synchronisation can be obtained by sampling the received signal at the bit rate regarding to the embodiment in FIG. 2. A fine synchronization will be achieved by using the cross-correlation property of the eight training sequences defined in the GSM standard, but in this case the received signals should be oversampled. A proper threshold level helps selecting the auto-correlation function of the desired user and regarding to this a fine sysnchronization will be established. Essentially, this information is obtained from block 25 in FIG. 2.

The improvement in system performance obtained by the use of the invention can be appreciated by considering FIG. 4, which shows the bit error rate BER versus ratio Eb/No (Eb=energy per bit, No=spectral noise density) for a GSM channel when using the invention (dashed line) and with a conventional receiver.

Even if the invention has been described with particular reference to the use in connection with GSM system, it can be applied without undue experimentation also to other systems in which the transmitted signals include a training sequence known a-priori. In particular, the adaptation module 18 is capable of generating the set of filtering coefficients also in multi-user systems, such as SDMA (Space Division Multiple Access) systems, in which two or more users within the same cell are allowed to use the same physical channel (time–frequency). In this case, it is necessary that said users use training sequences $x_p$ with sufficient orthogonal characteristics allowing the algorithm to distinguish between echoes originated by the different users Of course, without altering the principle of the invention, the implementing details may vary widely with respect to what has been described and illustrated, without thereby departing from the scope of the present invention.

What is claimed is:

1. A method of receiving digital signals comprising a training sequence $x_p(t)$ affected by a scalar response a(t) of a channel usable to generate an estimate of the transmission channel, wherein the digital signal is received in diversity as a plurality of signal replicas each comprising a respective replica $x_p(t)*a(t)$ of said training sequence, the method comprising the following operations:

generating a plurality of versions of the received digital signal separated by a given delay interval (T), each version comprising a respective set of signal replicas;

subjecting each of the versions of the received digital signal to a respective filtering action independently of the other versions, the respective filtering action being performed on each of the versions by applying to the respective set of signal replicas a respective first set of filtering coefficients ($w^*_{11}$ . . . $w^*_{N1}$; . . . $w^*_{1j}$ . . . $w^*_{Nj}$)

obtained starting from a respective initial set of filtering coefficients; and obtaining said respective initial set of filtering coefficients by subjecting the respective version of the received digital signal to a respective second filtering action performed independently of the respective second filtering actions effected on the other versions of the received digital signal, each of the respective second filtering actions being performed with a respective second set of filtering coefficients identified as a signal (u(t)) able to generate, by convolution (u(t)*$x_p$(t)) with the training sequence, a unitary function on a given time slot.

2. The method as defined in claim 1 wherein said respective second set of filtering coefficients (u(t)) are identified as a signal able to generate by convolution (u(t))*xp(t)) with the training sequence a unitary function on one bit.

3. The method as defined in claim 1 wherein said respective first set of filtering coefficients can be generated starting from a respective initial set of filtering coefficients by means of a Minimum Mean Square Error (MMSE) adaptation.

4. The method as defined in claim 3 wherein said adaptation is selected from the group constituted by a Recursive Least Square (RLS) adaptation and by a Least Mean Square (LMS) adaptation.

5. The method as defined in claim 4 wherein said minimum mean square error adaptation comprises an initial rapid convergence phase of the recursive least square (RLS) type followed by a phase of the least minimum square (MLS) type.

6. An apparatus for the reception of digital signals comprises a training sequence ($x_p$(t)) affected by a scalar response a(t) of a channel usable to generate an estimate of the transmission channel, the apparatus having a plurality of antennas operating in diversity, so that the digital signal is received in the form of a plurality of signal replicas comprising each a respective replica (xp(t)*a(t)) of said training sequence. The apparatus comprising:

delay means for generating a plurality of versions of the received digital signal separated by a given delay interval (T), each version comprising a respective set of signal replicas, second filtering means for subjecting each of the versions of the digital signal received to a respective filtering action indepenently from the other versions, the respective second filtering action being performed on each of said versions by applying to the respective set of signal replicas a respective second set of filtering coefficients ($W^*_{11}$ ... $W^*_{N1}$ ... $W^*_{11}$, $W^*_{1j}$ ... $W^*_{NJ}$) obtained starting from a respective initial set of filtering coefficients determined, and second filtering means for obtaining the respective initial set of filtering coefficients by subjecting the respective replica of the training sequence to a respective second filtering action performed independently from the respective second filtering actions performed on the other respective replicas of said training sequence; each of these respective second filtering actions being performed with a respective second set of filtering coefficient identified as a signal (u(t)) able to generate by convolution (u(t)*$X_p$(t)) with said training sequence a unitary function on a given time slot.

7. The apparatus as defined in claim 6 wherein said respective second set of filtering coefficients (u(t)) can be identified as a signal able to generate by convolution (u(t)*$X_p$(t)) with said training sequence a unitary function over a preset interval.

8. The apparatus as defined in claim 7 which further comprises an adaptation module which calculates the respective first set of filtering coefficients starting from the respective initial set of filtering coefficients by means of an adaptation of the minimum means square error type.

9. The apparatus as defined in claim 8 wherein said adaptation module can operate according to an algorithm chosen in the group comprising recursive least square adaptation of the type and least mean square adaptation.

10. The apparatus as defined in claim 9 wherein said adaptation module can operate with an initial rapid convergence phase of the recursive least square type followed by a phase of the least mean square type.

11. The apparatus as defined in claim 8 wherein said adaptation module can be arranged to generate a respective first set of filtering coefficients for each of a plurality of users within a same cell of a digital radio communication system in which the users use the same physical channel (time-frequency channel).

* * * * *